United States Patent
Barkol et al.

(10) Patent No.: US 10,540,354 B2
(45) Date of Patent: Jan. 21, 2020

(54) DISCOVERING REPRESENTATIVE COMPOSITE CI PATTERNS IN AN IT SYSTEM

(75) Inventors: Omer Barkol, Haifa (IL); Shahar Golan, Haifa (IL); Ruth Bergman, Haifa (IL); Yifat Felder, Yehud (IL); Arik Sityon, Ganne Tiqwa (IL); Mohammed J. Zaki, Troy, NY (US); Pranay Anchuri, Troy, NY (US)

(73) Assignee: Micro Focus LLC, Santa Clara, CA (US)

( * ) Notice: Subject to any disclaimer, the term of this patent is extended or adjusted under 35 U.S.C. 154(b) by 1533 days.

(21) Appl. No.: 13/274,918

(22) Filed: Oct. 17, 2011

(65) Prior Publication Data

US 2013/0097138 A1    Apr. 18, 2013

(51) Int. Cl.
*G06F 16/2453*    (2019.01)

(52) U.S. Cl.
CPC .............................. *G06F 16/24544* (2019.01)

(58) Field of Classification Search
CPC ......... G06F 17/30292; G06F 17/30489; G06F 17/30643; G06F 17/30692
USPC .................. 707/706, 797, 798, 805
See application file for complete search history.

(56) References Cited

U.S. PATENT DOCUMENTS

| | | | |
|---|---|---|---|
| 5,396,580 A * | 3/1995 | Fu ........................ | G06N 3/0427 706/12 |
| 7,299,213 B2 * | 11/2007 | Cristianini ..................... | 706/12 |
| 7,822,785 B2 | 10/2010 | Ayachitula et al. | |
| 7,926,031 B2 | 4/2011 | Faihe et al. | |
| 8,145,623 B1 * | 3/2012 | Mehta et al. ................. | 707/713 |
| 2005/0060287 A1 * | 3/2005 | Hellman et al. ................... | 707/2 |
| 2007/0028244 A1 * | 2/2007 | Landis et al. ................. | 718/108 |
| 2007/0198597 A1 * | 8/2007 | Betz ................ | G06F 17/30533 |
| 2008/0005143 A1 * | 1/2008 | Ayachitula et al. .......... | 707/101 |
| 2008/0005186 A1 * | 1/2008 | Ayachitula ............. | G06Q 10/06 |
| 2009/0125977 A1 * | 5/2009 | Chander et al. ................... | 726/1 |
| 2009/0193044 A1 * | 7/2009 | Buehrer et al. ............... | 707/101 |
| 2009/0210418 A1 * | 8/2009 | Arasu et al. ...................... | 707/6 |
| 2010/0174670 A1 * | 7/2010 | Malik ............... | G06F 17/30705 706/12 |
| 2011/0208679 A1 | 8/2011 | Watanabe et al. | |
| 2011/0238691 A1 * | 9/2011 | Gere et al. .................... | 707/769 |

(Continued)

OTHER PUBLICATIONS

Jaz Kandola, John Shawe-Taylor and Nello Cristianini ["Learning Semantic Similarity", Advances in Neural Information Processing Systems 15 (NIPS 2002) (Year: 2002).*

(Continued)

*Primary Examiner* — Kris E Mackes
*Assistant Examiner* — Soheila (Gina) Davanlou (57) ABSTRACT

A method for discovering representative composite configuration item (CI) patterns in an IT system that includes a plurality of configuration items may include data mining a graph representing the IT system to extract extended frequent composite CI patterns. The method may also include clustering the extended frequent composite CI patterns into clusters based on similarity between the maximal frequent composite CI patterns. The method may further include extracting a representative composite CI pattern for each of the clusters, and using an output device, outputting the representative composite CI pattern for each of the clusters.

17 Claims, 7 Drawing Sheets

(56) References Cited

U.S. PATENT DOCUMENTS

2011/0295788 A1\* 12/2011 Kowalski ............... 706/47

OTHER PUBLICATIONS

Julia Couto (Kernel K-Means for Categorical Data, James Madison University, Harrisonburg VA 22807, USA, coutoji@jmu.edu) (Year: 2005).*
Madduri et al., "A Configuration Management Database Architecture in Support of IBM Service Management", IBM Systems Journal, vol. 46, No. 3, 2007, pp. 441-457.
Kuramochi et al., "Finding Frequent Patterns in a Large Sparse Graph", Data Mining and Knowledge Discovery, 2005, Springer Science + Business Media, Inc., DOI: 10.1007/s10618-005-0003-9.
M. R. Garey and D. S. Johnson, "Computers and Intractability: A Guide to the Theory of NP-Completeness", W. H. Freeman and Co., 1979.
D. Cook and L. Holder, "Substructure Discovery Using Minimal Description Length and Background Knowledge", Journal of Artificial Intelligence Research, vol. 1, pp. 231-255, 1994.
M. Kuramochi and G. Karypis, "Frequent Subgraph Discovery", in 1st IEEE Int'l Conf. on Data Mining, Nov. 2001.
X. Yan and J. Han, "gSpan: Graph-Based Substructure Pattern Mining", in IEEE Int'l Conference on Data Mining, 2002.
J. Huan, W. Wang, and J. Prins, "Efficient Mining of Frequent Subgraphs in the Presence of Isomorphism", in IEEE Int'l Conf. on Data Mining, 2003.
A. Inokuchi, T. Washio, and H. Motoda, "Complete Mining of Frequent Patterns from Graphs: Mining Graph Data", Machine Learning, vol. 50, No. 3, pp. 321-354, 2003.
S. Nijssen and J. Kok, "A Quickstart in Frequent Structure Mining Can Make a Difference", in ACM SIGKDD Int'l Conf. on KDD, 2004.
V. Chaoji, M. A. Hasan, S. Salem, and M. J. Zaki, "An Integrated, Generic Approach to Pattern Mining: Data Mining Template Library", Data Mining and Knowledge Discovery, vol. 17, No. 3, pp. 457-495, Dec. 2008.
M. A. Hasan and M. J. Zaki, "Output Space Sampling for Graph Patterns", Proceedings of the VLDB Endowment ($35^{th}$ International Conference on Very Large Data Bases), vol. 2, No. 1, pp. 730-741, 2009.
C. Chen, C. Lin, X. Yan, and J. Han, "On Effective Presentation of Graph Patterns: a Structural Representative Approach", in Proceeding of the 17th ACM conference on Information and knowledge management. ACM, 2008, pp. 299-308.
Y. Liu, J. Li, and H. Gao, "Summarizing Graph Patterns", IEEE Transactions on Knowledge and Data Engineering, p. 10.1109/TKDE.2010.48 (online early access), 2011.
S. Zhang, J. Yang, and S. Li, "Ring: An Integrated Method for Frequent Representative Subgraph Mining", in 2009 Ninth IEEE International Conference on Data Mining. IEEE, 2009, pp. 1082-1087.
V. Chaoji, M. A. Hasan, S. Salem, J. Besson, and M. J. Zaki, "Origami: A Novel and Effective Approach for Mining Representative Orthogonal Graph Patterns", Statistical Analysis and Data Mining, vol. 1, No. 2, pp. 67-84, Jun. 2008.
M. Kuramochi and G. Karypis, "Finding Frequent Patterns in a Large Sparse Graph", Data Mining and Knowledge Discovery, vol. 11, No. 3, pp. 243-271, 2005.
Fiedler and C. Borgelt, "Support Computation for Mining Frequent Subgraphs in a Single Graph", in 5th International Workshop on Mining and Learning with Graphs, 2007.
B. Bringmann and S. Nijssen, "What is Frequent in a Single Graph?", in 12th Pacific-Asia Conference on Knowledge Discovery and Data Mining, 2008.
S. Li, S. Zhang, and J. Yang, "Dessin: Mining Dense Subgraph Patterns in a Single Graph", in Scientific and Statistical Database Management. Springer, 2010, pp. 178-195.
C. Besemann and A. Denton, "Mining Edge-Disjoint Patterns in Graph-Relational Data", in Proc. Workshop on Data Mining for Biomedical Informatics at SDM-07, Minneapolis, MN, USA. Citeseer, 2007.
N. Vanetik, S. Shimony, and E. Gudes, "Support Measures for Graph Data", Data Mining and Knowledge Discovery, vol. 13, No. 2, pp. 243-260, 2006.
T. Calders, J. Ramon, and D. Van Dyck, "All Normalized Anti-Monotonic Overlap Graph Measures are Bounded", Data Mining and Knowledge Discovery, vol. 10.1007/s10618-011-0217-y (online first), 2011.
Y. Dinitz, "Dinitz' Algorithm: The Original Version and Evens Version", Theoretical Computer Science, pp. 218-240, 2006.
A. Itai, Y. Perl, and Y. Shiloach, "The Complexity of Finding Maximum Disjoint Paths with Length Constraints", Networks, vol. 12, p. 277286, 1982.
D. Cvetkovic, P. Rowlinson, S. Simic, and N. Biggs, "Eigenspaces of Graphs", Cambridge University Press Cambridge, UK, 1997.
Cordella, P. Foggia, C. Sansone, and M. Vento, "A (Sub) Graph Isomorphism Algorithm for Matching Large Graphs", Pattern Analysis and Machine Intelligence, IEEE Transactions on, vol. 26, No. 10, pp. 1367-1372, 2004.
H. Bunke and K. Shearer, "A Graph Distance Metric Based on the Maximal Common Subgraph", Pattern recognition letters, vol. 19, No. 3-4, pp. 255-259, 1998.
D. Hidovic and M. Pelillo, "Metrics for Attributed Graphs Based on the Maximal Similarity Common Subgraph", International Journal of Pattern Recognition and Artificial Intelligence, vol. 18, No. 3, pp. 299-313, 2004.
M. Neuhaus, K. Riesen, and H. Bunke, "Fast Suboptimal Algorithms for the Computation of Graph Edit Distance", Structural, Syntactic, and Statistical Pattern Recognition, pp. 163-172, 2006.
Kondor and J.-P. Vert, "Diffusion Kernels", in Kernel Methods in Computational Biology, B. Scholkopf, K. Tsuda, and J.-P. Vert, Eds. The MIT Press, 2004.
Y. Zhou, H. Cheng, and J. Yu, "Graph Clustering Based on Structural/Attribute Similarities", Proceedings of the VLDB Endowment, vol. 2, No. 1, pp. 718-729, 2009.
S. E. Schaeffer, "Graph Clustering", Computer Science Review, vol. 1, No. 1, pp. 27-64, Aug. 2007.
S. V. Dongen, "Graph Clustering Via a Discrete Uncoupling Process", SIAM J. on Matrix Analysis and Applications, vol. 30, No. 1, pp. 121-141, 2004.
J. Shi and J. Malik, "Normalized Cuts and Image Segmentation", IEEE Trans. Pattern Analysis and Machine Intelligence, vol. 22, No. 8, pp. 888-905, Aug. 2000.
V. Chvatal, "A Greedy Heuristic for the Set-Covering Problem", Mathematics of operations research, pp. 233-235, 1979.

\* cited by examiner

DISCOVERING REPRESENTATIVE COMPOSITE CI PATTERNS IN AN IT SYSTEM

BACKGROUND

Many business, especially (but not only) large ones, manage their Information Technology (IT) systems with the help of Configuration Management Data Base (CMDB).

CMDB is a repository of information related to all the components of an IT system, which is used to manage and query the IT infrastructure of an organization. It typically contains details of the configuration items (CIs), for example, servers, software, running processes, storage systems and devices, printers, routers, etc) of the IT system.

Typically a CMDB may be represented in the form of a graph. As such it can be considered to be a single large multi-attributed graph, where the nodes represent the various CIs and the edges (or arcs) represent the connections between the CIs (for example, the processes on a particular server, along with starting and ending times).

BRIEF DESCRIPTION OF THE DRAWINGS

Embodiments of the present invention are described in the following detailed description and illustrated in the accompanying drawings in which.

DETAILED DESCRIPTION

A Configuration Management Data Base (CMDB) typically maintains a graph representation of the IT world of an organization. In order to manage its IT world, the IT manager of the organization has to maintain and update the graph by obtaining updated information regarding the state of this graph. The graph itself may be constructed and updated using an auto-discovery mechanism. Within this process, a crawler may be used to search the entire IT network in order to automatically collect configuration information pertaining to the different graph parts (nodes, edges) and in order to update configuration information pertaining to graph parts that have changed since a previous update. Yet, the collected configuration information only relates to simple configuration items (Cis), which are typically represented as nodes in the CMDB graph. As the graph is very big, for many applications, an aggregated graph may be considered, where a group of simple CIs, which form a sub-graph, reside together. Moreover, the usefulness of this aggregation may go beyond visualization. In particular, this aggregation may be used in managing configuration policies for different composite CIs, as described hereinabove. A good example of such a case is a computer (say, NT), which may be presented in such a graph as a composite CI, with CPUs, file-systems, etc, as its CIs. Such composite CIs may be identified, for example, by an auto-discovery CMDB application by modeling in advance the composite CIs (e.g., a computer is modeled and thus is detected as a composite CI). However, it may be difficult or even impossible to model composite CIs that are CMDB specific (e.g. business applications), yet identifying these composite CIs may be important to the IT manager.

This may lead to attempting to automatically define new composite CI types out of the data, which refer to a functionally-meaningful composite CI unit where the composite CIs instances of each of these types might not be identical but rather only similar to one-another (for example, consider composite CI types such as a computer unit, an oracle server, etc.).

A CMDB provides a wealth of information about the largely undocumented IT practices of a large organization, and thus mining the CDMB graph for frequent subgraph patterns (frequent composite CI patterns) may reveal the actual infrastructure patterns. Once mined, these patterns can be used to either set as the default IT policies, or to refine them if found unsatisfactory. "Frequent composite CI patterns" refer to composite CI patterns that are frequently found in the CMDB graph representing the IT system. "Frequent" is a comparative term, and in some examples a frequency threshold may be considered, so that if the frequency of a certain composite CI pattern is equal or above that threshold it can be said that that composite CI pattern is "frequent".

Mining a CMDB graph may pose several challenges. The CMDB graph is a massive, multi-attributed, and complex graph. There are various types and sub-types of CIs, which may be hierarchically related. CIs further have various associated attributes and metadata elements. The CMDB graph may typically include a lot of repetitive labels, namely, the CIs and their various attributes, exhibiting frequent subgraph patterns. For example, there can be hundreds and thousands of running processes of the same type, running on (and thus connected to) a single server. The vast majority of frequent graph pattern mining algorithms assume that the CMDB graph consists of many different graphs, so that the frequency may be computed by counting how many graphs in the database contain a given pattern. The containment is typically defined in terms of subgraph isomorphism, i.e., the node mapping, also called an embedding, that corresponds to an isomorphism between a pattern and a subgraph of the database graph. As long as there exists an embedding of the pattern in a database graph, the support (or frequency) can be incremented by one. On the other hand, the support of a pattern in a single graph usually involves finding all the possible pattern embeddings (or node/edge disjoint embeddings), which may potentially be exponentially large given the typical size and order of a CMDB graph. Furthermore, the subgraph isomorphism problem is rendered more time and computer resources consuming due to repetitive CIs. Simply mining the frequent subgraph patterns from the CMDB graph may not be enough to discover frequent composite CI patterns. As is well known in frequent pattern mining, there can be a huge number of mined patterns, with many of them being small variations of one another. It is thus suggested to consider representative composite CI patterns.

Figure 1:
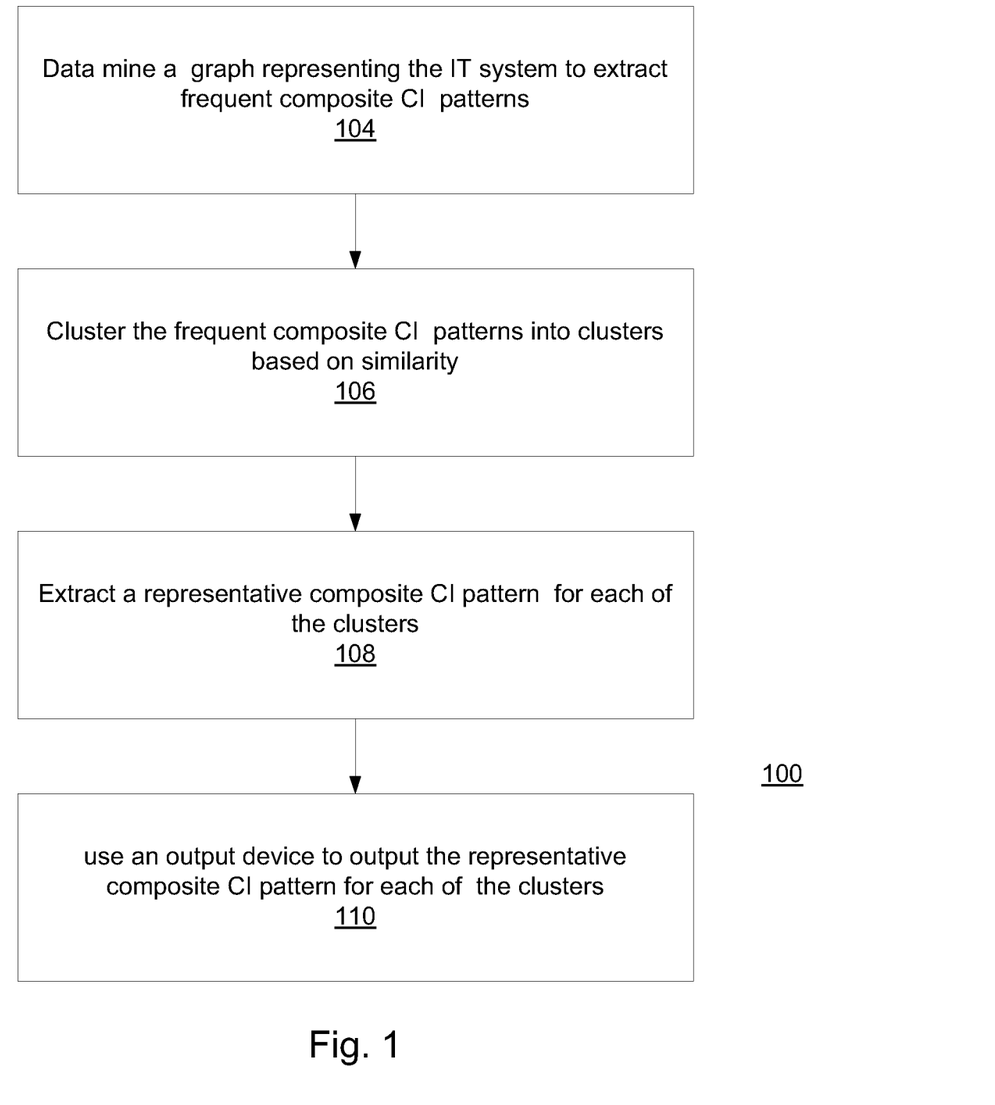
FIG. 1 shows an example of a CMDB graph representing an IT system according to an example of the invention.

A method for discovering representative composite configuration item patterns for an IT system that includes a plurality of configuration items, in accordance with an example, is illustrated in FIG. 1. Method 100 may include data mining 104 the graph representing the IT system to extract extended frequent composite CI patterns. The method may further include clustering 106 the extended frequent composite CI patterns into clusters based on similarity between the frequent composite CI patterns. The method may also include, for each of the clusters, extracting 108 a representative frequent composite CI pattern for each of the clusters. The method may further include using an output device, outputting 110 the representative composite CI pattern for each of the clusters.

In some examples, it is suggested, when data mining a CMDB graph, which is a large sparse graph to obtain extended frequent composite CI patterns, to use a network-flow based definition of graph support that is an upper-bound on the number of edge disjoint embeddings, pruning patterns out of consideration when they become infrequent.

In some examples, data mining the large sparse graph to obtain frequent composite CI patterns may be based on random walks in the pattern space. In some examples, a fast filter-based approach may be used to eliminate isomorphic (i.e., duplicate) patterns.

In some examples, a diffusion-based graph similarity technique may be used to compute pair-wise similarities between two labeled graphs. This takes into account both the structure and labels of the graphs. Given the pairwise similarity matrix, spectral graph clustering may be used to extract groups of related patterns. Representative patterns may be then selected, for example, via a coverage-based approach.

Using a method for discovering representative patterns in a large sparse graph, in accordance with some examples, allows finding meaningful IT infrastructure patterns, referred to, hereinafter, as representative frequent composite CI patterns. Although CMDB graphs are described herein, the proposed approach is generic, and may be applied in many other real-world applications with similar characteristics, namely single large graph database, multiple attributes on the nodes, and many repeated labels.

Some preliminary concepts are discussed hereinafter:

Let $\Sigma$ denote a given set of labels. A labeled graph is a triple $G=(V,E,L)$, where V is the set of vertices or nodes, $E \subseteq V \times V$ is the set of (unordered) edges, and L is the labeling function for both nodes and edges, so that $L(V)$ is the label of a node v, and $L(e)=L(a,b)$ is the label of an edge $e=(a, b)$. The order of the graph is the number of nodes $|V|$, and the size of the graph is the number of edges $|E|$. $G'=(V',E',L')$ is a subgraph of $G=(V,E,L)$ denoted $G' \subseteq G$, if there exists a 1-1 mapping $\pi$:

$V' \rightarrow V$, such that $(v_i, v_j) \in E'$ implies $(\pi(v_i), \pi(v_j)) \in E$.

Further, $\pi$ must preserve vertex and edge labels, i.e., $L'(v_i)=L(\pi(v_i))$ for all $v_i \in V'$, and $L'(v_i, v_j)=L(\pi(v_i), \pi(v_j))$ for all edges $(v_i, v_j) \in E'$. The mapping $\pi$ is called a subgraph isomorphism from G' to G. If $G' \subseteq G$ it means that G contains G'. If $G' \subseteq G$ and $G \subseteq G'$, it is understood that G and G' are isomorphic.

Let $G=(V,E,L)$ be a single large database graph, and let $P=(V',E',L')$ be a candidate pattern, whose support is to be computed. Let $\pi$ be a subgraph isomorphism from P to G. The sequence $\pi(v_1), \pi(v_2), \ldots \pi(v_n)$ over all $v_i \in V'$ is called an embedding of G' in G. For an edge $e_j=(a_i, b_i) \in E'$, define $\pi(e_i)=\pi(a_i, b_i)=\pi(a_i), \pi(b_i) \in E$. The sequence $\pi(E')=\pi(e_1), \pi(e_2), \ldots \pi(e_m)$ over all edges $e_i \in E'$ is called an edge mapping of P in G. For example, given the database graph G in FIG. 2A, and the candidate frequent pattern P in FIG. 2B, the subgraph isomorphism $\pi_3$ from P to G specified by the mapping $p0 \rightarrow g0$, $p1 \rightarrow g9$, $p2 \rightarrow g7$, $p3 \rightarrow g11$, corresponds to the embedding 0, 9, 7, 11, and the edge mapping (0, 9), (9, 7), (7, 11), (11, 9). Since $\pi$ uniquely specifies the embedding and edge mapping, these terms are used interchangeably.

There are several ways to compute the number of occurrences, also referred to as the "support", of P in G. The most straightforward definition is to define the support of P as the number of possible embeddings of P in G, denoted $\sup_a(P)$. Table 1 below shows all the possible embeddings of P in G.

TABLE 1

| | |
|---|---|
| $\pi_0$ | {0, 1, 3, 2} |
| $\pi_1$ | {0, 1, 3, 4} |
| $\pi_2$ | {0, 1, 7, 6} |
| $\pi_3$ | {0, 9, 7, 11} |
| $\pi_4$ | {0, 9, 10, 11} |
| $\pi_5$ | {5, 1, 3, 2} |
| $\pi_6$ | {5, 1, 3, 4} |
| $\pi_7$ | {5, 1, 7, 6} |
| $\pi_8$ | {5, 9, 7, 11} |
| $\pi_9$ | {5, 9, 10, 11} |

There are ten embeddings of P in G in this example, thus $\sup_a(P)=10$. Alas, there can be numerous embeddings of a pattern in a database graph. For example, if $G=P=K_n$, where $K_n$ is the complete graph on n nodes, with all node and edge labels being the same, then there are n! distinct embeddings of P in G.

Due to label multiplicities in CMDB graphs contribute to the enormity of the problem. To avoid combinatorial blowup, support may also be defined as the maximum number of node or edge disjoint embeddings of P in G, denoted $\sup_n(P)$ and $\sup_e(P)$, respectively. Let $\Pi$ be the set of all possible embeddings of P in G. Two embeddings $\pi, \pi' \in \Pi$ are node disjoint, if $\pi(v_i) \neq \pi(v_j)$ for all nodes $v_i, v_j \in V'$. $\pi$ and $\pi'$ are edge disjoint if $(\pi(v_i), \pi(v_j)) \neq (\pi'(v_a), \pi'(v_b))$ for all edges $(v_i, v_j), (v_a, v_b) \in V'$. Tables 2 and 3, below, show examples of a maximum set of edge and node disjoint embeddings, respectively.

TABLE 2

| Edge-Disjoint embeddings | |
|---|---|
| $\pi_1$ | {0, 1, 3, 4} |
| $\pi_4$ | {0, 9, 10, 11} |
| $\pi_7$ | {5, 1, 7, 6} |

TABLE 3

| Node-Disjoint embeddings | |
|---|---|
| $\pi_0$ | {0, 1, 3, 2} |
| $\pi_8$ | {8, 9, 7, 11} |

These sets are not unique; for example, the embedding set $\{\pi_0, \pi_3, \pi_9\}$ is also edge-disjoint.

However, the edge-disjoint support of P is $\sup_e(P)=3$, and the node disjoint support is $\sup_n(P)=2$. Finding the maximum number of edge (or node) disjoint embeddings is equivalent to finding the maximum independent set (MIS) in an embeddings graph, where each embedding is a node, and there exists an edge between two embeddings if they share an edge (or node). Unfortunately, both the edge and node disjoint embeddings require heavy computing resources.

According to an example, it is proposed to approximate the edge-disjoint support using a network-flow based approach.

Edge-disjointness is considered, since node-disjointness is more constrained (every node-disjoint embedding is also an edge-disjoint embedding, but not vice-versa).

Many methods have been developed for frequent subgraph mining. Recently, methods that sample and summarize subgraph patterns have gained more traction. However, these methods assume that the database contains many different graphs, and cannot directly be applied when the database is just a single large graph.

This is because they define pattern support to be the number of graphs in the database that contain that pattern. As long as a single embedding is found, the support can be incremented by one, and as such these methods do not have to deal with the problem of enumerating all the embeddings, or computing the maximum number of edge (or node) disjoint embeddings. Also, pattern support, as defined for a database of many graphs, is anti-monotonic, i.e., a supergraph cannot have support more than any of its subgraphs. This property allows for fast pruning of candidate patterns during a pattern search, since a pattern (and all of its extensions) may be pruned, when its support falls below a user specified minimum support threshold, minsup. However, the number of embeddings is clearly not anti-monotonic.

For example, let minsup=3, and let the database graph comprise a node labeled A, connected to two nodes labeled B, and further, let each of the B nodes be connected to three nodes labeled C. In this database graph, the edge A-B has two embeddings (below minsup), but the pattern A-B-C has six embeddings (above minsup). The lack of antimonotonicity is clearly a problem for support computation.

Several recent approaches have been proposed to tackle the challenges in mining a single graph. A support counting measure was proposed that is anti-monotonic. Three different formulations were proposed for mining a single graph. The first is based on an exact maximum independent set (MIS) of the overlap graph, which gives the exact set of edge disjoint embeddings. The other two approaches are based on approximate MIS, which provide a subset and superset of the edge disjoint embeddings.

However, they require enumerating all the embeddings and then discarding the ones that overlap. Since the total number of possible embeddings is practically exponential, it renders these methods incapable of finding greater patterns. According to an example, instead of MIS, a network-flow based approach is proposed.

According to an example, data mining of a CMDB graph may include three actions. Given the particular characteristics of a CMDB graph, first, the CMDB graph may be pre-processed to extract the relevant attributes for each configuration item, and to summarize the graph. Second, random walks may be performed in the pattern space to extract a sample of the extended frequent composite CI patterns. Third, the extended frequent composite CI patterns (since many of them may be similar) may be clustered and a set of representative patterns extracted from each cluster. The representative patterns effectively constitute infrastructure patterns and may be presented to the IT practitioners as composite CI types to help managing, setting IT configuration policies throughout the organization, and generally referring to the representative composite CI types. Details of each aspect of the proposed method are given below.

CMDB Graph Pre-Processing:

CMDB graphs may include many different types of composite CIs, and each CI may have many possible attributes (with various values). Furthermore, there may be many degree one nodes, also called "leaf nodes" in a CMDB graph. Before mining these graphs, they may be preprocessed in various ways to aid in interpretation and mining. For example, attributes of CIs in the graph may be pruned and disregard in the data mining process. Thus, for example, instead of having the following CI: CI type: CPU, Attribute: rate Value: 3 Gbs, Attribute: vendor Value: Intel, Attribute: update-time Value September-30 20:02:12, the last attribute may be pruned and disregarded, so that the CI considered includes after the pruning: CI type: CPU, Attribute: rate Value: 3 Gbs, Attribute: vendor Value: Intel. Attributes may be pruned based on their entropy (explained hereinafter).

Further, for example, multiplicities among the leaf nodes may be summarized. For example, Instead of having a node with 316 child nodes of type IP address, one node of type IP address is kept, marked as having 316 multiplicities.

Entropy-based Attribute Pruning: Based on the distribution of values for each attribute, it was observed that across the various instances of the same CI type, some of the attributes either have a common single value, or have all distinct values. Let $$p_v = \frac{m_v}{m}$$

be the probability of observing a value v for an attribute a of a given CI type, where m is the total number of occurrences of attribute a, and $m_v$ is the number of times a has value v. The entropy of a is defined as $E(\alpha)=\Sigma_v p_v \log p_v$. The uninformative attributes may be pruned, namely those that have very low or very high entropy, by discarding the tails of the entropy distribution (e.g., discarding attributes with the lowest 5% and highest 95% entropy). This may result in a significant reduction in the number of attributes.

Summarizing Leaf Nodes: A known peculiarity of CMDB graphs is that a vast majority of nodes are leaf nodes, defined as those nodes with degree one. Further, an internal node, defined as a node with degree which is more than one, can be connected to many of the same types of leaf nodes, a characteristic referred to herein as "node multiplicity". Some of the CI types (e.g. process, IP address, etc.) have a wide range of multiplicities.

Leaf node summarization may be employed, which reduces the size of CMDB graphs significantly, and at the same time aids interpretation of the mined infrastructure patterns. For each leaf node u with CI type t, its same label siblings may be defined as: $Sib(u,t)=\{x|L(x)=t, x$ is a leaf node, x and u have common neighbor$\}$.

For every CI type t, its multiplicities may be defined as: $Mult(t)=\{m|\exists u, u$ is a leaf, $L(u)=t, |Sib(u,t)|=m\}$.

Figure 3:
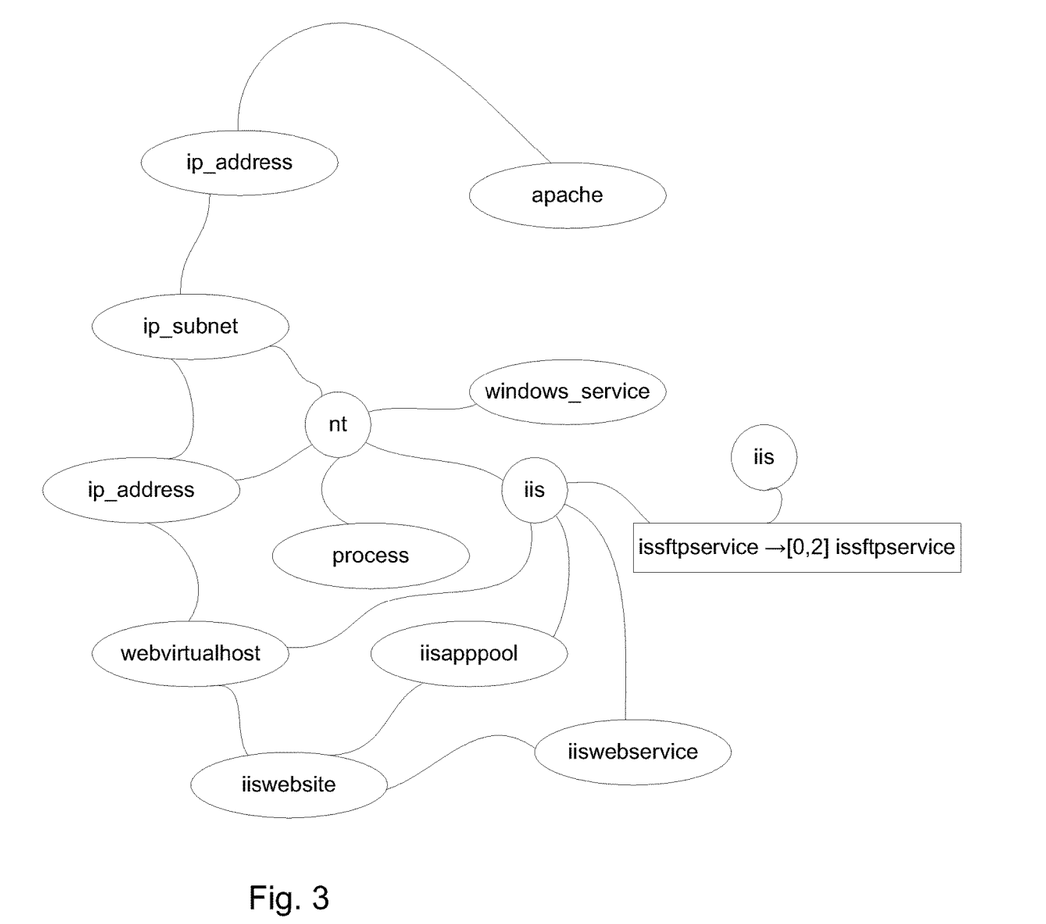
FIG. 3 illustrates a snippet from a CMDB graph, which includes a label indicating that a specific leaf node is connected to up to two other leaf nodes with same CI type.

In other words, the multiplicities of CI type t, is a multiset which includes the number of the occurrences of that CI type t at the leaf level with common internal neighbors. The multiplicities Mult(t) may be discretized using equi-width binning. For each internal node connected to leaf nodes, a new label in the form x→[l,u]y may be attached, which is interpreted as internal node x having between l and u occurrences of CI type y as a leaf. FIG. 3, illustrating a snippet from a CMDB graph, includes an example of such a label, namely, issftpservice→[0, 2] issftpservice, meaning that issftpservice is connected to up to two other leaf nodes with same CI type issftpservice.

Extracting Extended Frequent Composite CI Patterns:

This action is aimed at extracting a sample of extended and even maximal frequent composite CI patterns, which are subgraphs of the large, typically sparse, CMDB graph.

An "Extended frequent composite CI pattern" refers to a frequent composite CI pattern which is a subgraph of the CMDB graph, and which when considered with an adjacent graph part (called hereinafter "an extension") may still be regarded as frequent composite CI pattern of the CMDB graph.

A "Maximal frequent composite CI pattern" refers to an extended frequent composite CI pattern, which when adding to it an extension is no longer a frequent composite CI pattern in the CMDB graph. Thus, is it said to be "Maximal".

This may be done, for example, by performing random walks in the pattern space, starting by finding frequent composite CI patterns in the graph, considering one of the found frequent composite CI patterns as a candidate extended frequent composite CI pattern and adding an extension from the graph—a randomly selected edge and its adjacent node (for brevity it is hereinafter referred to as a "graph part"), which is found adjacent to that candidate extended frequent composite CI pattern in the graph.

After the addition of the randomly selected graph part to the candidate frequent composite CI pattern, the support for that candidate is computed so it may be determined whether it still qualifies as frequent. If so, another randomly selected graph part may be added, otherwise, that graph part is rejected, and another randomly selected graph part may be considered.

The process is carried out iteratively by adding more and more randomly selected graph parts and computing the support for the candidate with the newly added graph parts in the graph to determine whether the candidate configuration pattern, with the newly added graph parts, still constitutes a frequent composite CI pattern in the graph. This process may be repeated up to when a predetermined condition is met (e.g. until a candidate extended composite CI pattern is extended to include a predetermined number of CI items) or until a latter addition of another randomly selected graph part does not qualify the candidate composite CI pattern anymore as a frequent composite CI pattern in the graph. The previously considered candidate configuration pattern, that was still frequent, is then determined to be a maximal frequent composite CI pattern and included in a set of maximal patterns M for the graph.

In performing the random walks in the pattern space of the graph the number of random walks to perform may be predetermined, for example automatically or as input from a user.

It is important to note that, unlike other graph mining approaches that check for isomorphism during pattern growth (to eliminate duplicates), data mining the graph in the presently suggested approach does not involve seeking for isomorphism until all the predetermined number of walks are completed. This way isomorphism is only considered with respect to maximal frequent composite CI patterns, and not during the process of adding the edges.

As mentioned earlier, according to some examples, the random walks may be performed (i.e. extensions may be added) up to when a predetermined condition is met, or until a latter addition of another randomly selected graph part does not qualify the candidate composite CI pattern anymore as a frequent composite CI pattern in the graph. In the latter case the extended frequent composite CI pattern is referred to as "maximal frequent composite CI pattern".

For sake of brevity and as an example, the following description deals with "maximal frequent composite CI pattern", which is a particular, extreme, case of the more general "extended frequent composite CI pattern" case.

Figure 2A:
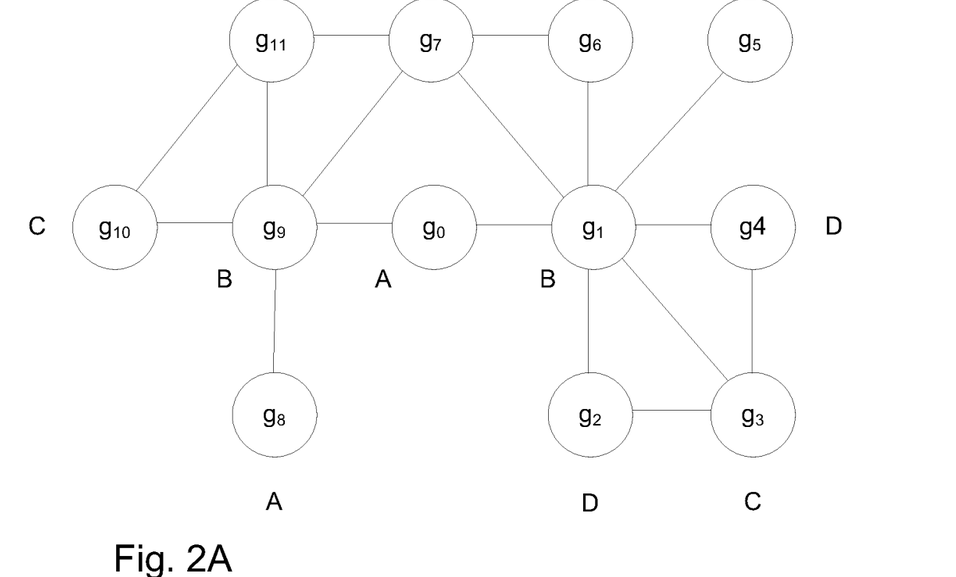
FIG. 2A illustrates a graph representation of a database (graph P).
Figure 2B:
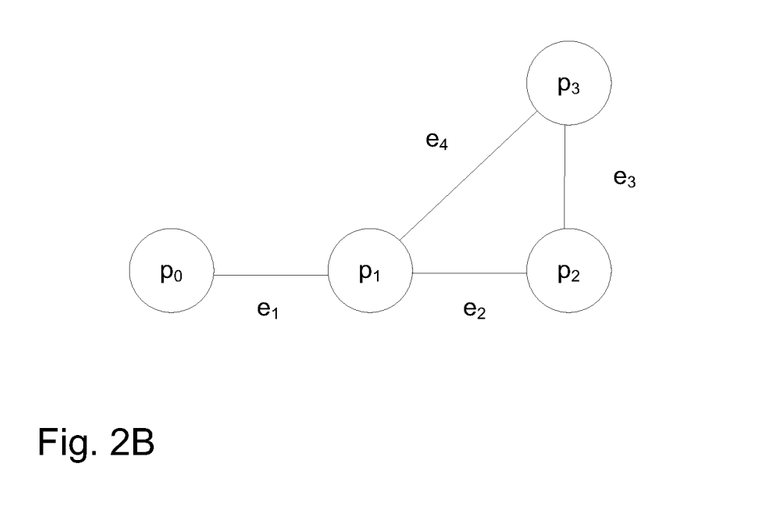
FIG. 2B illustrates a candidate frequent pattern P for graph G of FIG. 2A.

Within a given walk, it may be assumed that the edges and nodes in P are numbered in the order in which they are added to generate P, starting from an empty graph. Edge ordering automatically leads to node ordering as well. For example, FIG. 2A shows an example of a database graph G, and FIG. 2B shows a candidate maximal frequent composite CI pattern P from the graph shown in FIG. 2A. $e_1=(p_0, p_1)$ is the first randomly added edge, $e_2=(p_1, p_2)$ is the second randomly added edge, and $e_3=(p_2, p_3)$ is the third randomly added edge to P. In this example are forward edges, i.e., an edge that introduces at least one new node to P. The nodes are ordered from $p_0$ to $p_3$. Due to node ordering, a forward edge is implicitly directed from a lower to a higher numbered node. The last edge to be randomly added to complete P is $e_4=(p_3, p_1)$, and is an example of a backward edge, defined to be an edge between existing nodes. A backward edge is implicitly directed from a higher to lower numbered node. This direction information may be used in a flow-based support computation as detailed hereinafter.

Network-Flow Based Pattern Support: a flow network $G=(V,E)$ is a directed graph with two distinguished vertices—source s and sink t. Every ordered edge $(u,v) \in E$ has a capacity $c(u,v) \geq 0$. A flow in this network is a function $f: E \rightarrow R$ that satisfies the following properties: i) capacity constraint: $f(u,v) \leq c(u,v)$, and ii) flow conservation: $\Sigma_{u \in V} f(u,v) - \Sigma_{u \in V} f(v,u) = 0$, for all $v \in V \setminus \{s,t\}$. The value of a flow is defined as $|f| = \Sigma_{u \in V} f(s,v)$, and maximum flow is a flow with a maximum value. It is known that if all the edge capacities $c(u, v)$ are integers, then there exists a maximum flow with only integer flows on the edges. A path from node u to v in a flow network $G=(V,E)$ is a sequence of distinct vertices $(v_1, v_2, \ldots, v_k)$ such that $u=v_1, (v_i, v_{i+1}) \in E$ for all $1 \leq i \leq k-1$, and $v_k=v$. The length of this path is $k-1$. A path from s to t is also called an s-t path.

A flow network may be constructed in which the maximum flow corresponds to an upper bound on the edge disjoint support of the pattern. Any embedding of a pattern may be viewed as a path from s to t in the flow network, and edge disjointness can be imposed by using unit capacities on the edges. Consider a pattern $P=(V',E',L')$, and a database graph $G=(V,E,L)$. Let $E'=\{e_1, e_2, \ldots, e_m\}$ be an ordering of the edges in P (e.g., the order in which pattern P was obtained). Recall that each edge is oriented, i.e., it is a forward or backward edge. Let $\Pi_i$ denote the set of all embeddings in G for a single edge $e_i \in E'$. For example, table 4 below, shows the embeddings for each oriented edge in P.

TABLE 4

Edge Embeddings

| A-B<br>$e_1(p_0, p_1)$<br>$\Pi_1$ | B-C<br>$e_2(p_1, p_2)$<br>$\Pi_2$ | C-D<br>$e_3(p_2, p_3)$<br>$\Pi_3$ | D-B<br>$e_4(p_3, p_1)$<br>$\Pi_4$ |
|---|---|---|---|
| 0, 1 | 1, 3 | 3, 2 | 2, 1 |
| 0, 9 | 1, 7 | 3, 4 | 4, 1 |
| 5, 1 | 9, 7 | 7, 6 | 6, 1 |
| 8, 9 | 9, 10 | 7, 11 | 11, 9 |
|  |  | 10, 11 |  |

The flow network $F=(V_F, E_F)$ is constructed from the set of embeddings by setting $V_F$ to be the set of distinct nodes over all the edge embeddings $\Pi_i$, and by adding the directed edge $(a_j, b_j)$, with capacity $c(a_j, b_j)=1$, for each embedding $a_j, b_j \in \Pi_i$, with $1 \leq j \leq |\Pi_i|$ and $1 \leq i \leq m$.

Figure 4:
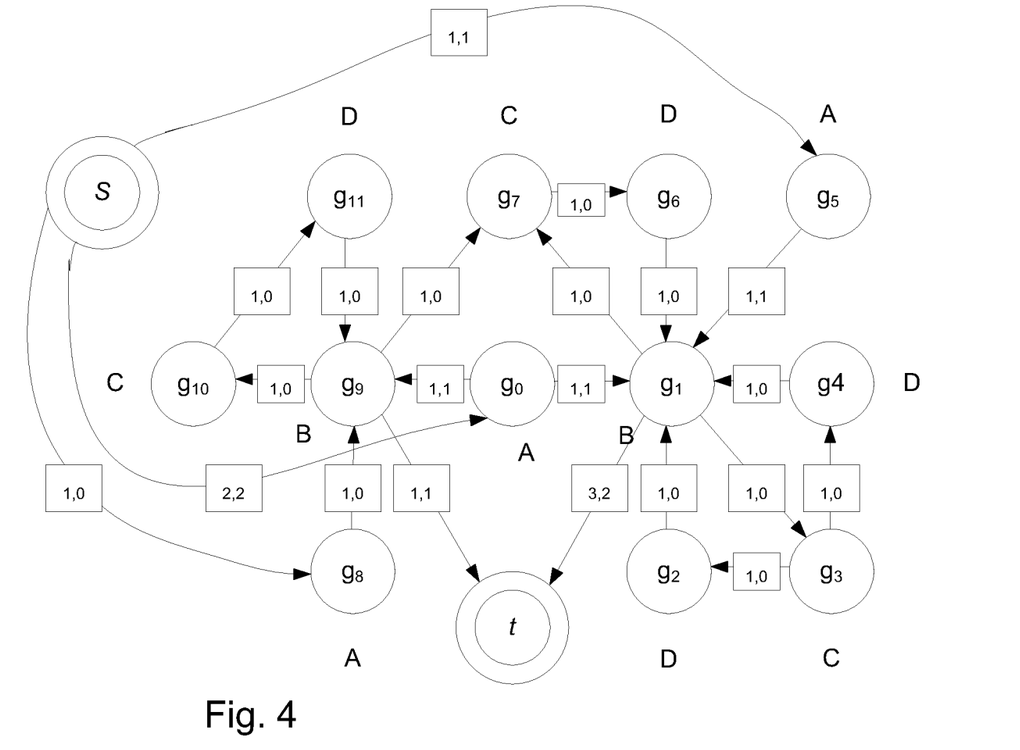
FIG. 4 illustrates a flow network obtained from the embeddings of each edge in graph P (shown in FIG. 2A).

Further, for each distinct u an edge (s, u) is added such that $(v,u) \in \Pi_1$, with capacity $c(s, u)=n_u$, where $n_u$ is the number of time node u appears in $\Pi_1$. Finally, we add an edge (v, t) for each distinct v such that $(v,u) \in \Pi_m$, with capacity $c(v, t)=v_n$ where $n_v$ is the number of times v appears in $\Pi_m$. FIG. 4 illustrates the flow network obtained from the embeddings of each edge in P. For instance, since $(0,1) \in \Pi_1$, edge (0, 1) may be added in F with capacity 1.

Likewise, since $(2,1) \in \Pi_4$, edge (2, 1) may be added in F with capacity 1. The same may be done for all embeddings in $\Pi_j$, for $1 \leq j \leq 4$. There are three distinct start nodes in $\Pi_1$, namely {0, 5, 8}, thus three edges may be added from the source s: (s, 0) with capacity 2, (s, 5) with capacity 1, and (s, 8) with capacity 1. Finally, there are two distinct end nodes in $\Pi_4$, namely {1, 9}, thus two edges may be added to the sink t: (1, t) with capacity 3, and (9, t) with capacity 1.

The flow-based support of a pattern P, denoted $\sup_f(P)$, is defined as the maximum flow in the flow network for P.

There are several efficient implementations of maximum flow. For example, Dinic's algorithm may be used which is based on blocking flows. In special cases where all the edges have a unit capacity it has complexity $$O\left(\min\left(V^{\frac{2}{3}}, E^{\frac{1}{2}}\right) \cdot E\right).$$

It is evident from FIG. 4 that the maximum flow value is 3, thus $\sup_f(P)=3$. Table 5 below shows the three disjoint edge mappings for P, corresponding to the three disjoint embeddings in table 2.

TABLE 5

| Disjoint Edge Mapping: |
| --- |
| A-B, B-C, C-D, D-B |
| $(p_0, p_1), (p_1, p_2), (p_2, p_3), (p_3, p_1)$ |
| (5, 1), (1, 7), (7, 6), (6, 1) |
| (0, 1), (1, 3), (3, 4), (4, 1) |
| (0, 9), (9, 10), (10, 11), (11, 9) |

The flow-based support of P is an upper-bound on the edge disjoint support. This may facilitate pruning any extension (an immediate supergraph) of pattern P if supf (P)<min-sup.

Thus no extension of P can be frequent according to edge disjoint support. It is worth noting that the edge-disjoint support of P is equal to the maximum number of edge disjoint s-t paths of length m+2 in the flow network. However, finding the maximum disjoint paths with constraints on the length is NP-Complete (Non-deterministic Polynomial time). For this reason no restrictions are placed on the length of the paths, and thus an upper-bound on the edge-disjoint support may be obtained. It is important to note that Dinic's algorithm finds the shortest s-t paths that are saturated. Thus the flow-based support is close to the actual support if the shortest s-t path length in the flow network is close to the number of edges in the candidate maximal frequent composite CI pattern.

Pruning Isomorphic Patterns:

Given a minimum support threshold minsup, and given k, a predetermined number of random walks, k random walks are performed in the pattern space, to yield a set M of k maximal frequent composite CI patterns, using flow-based support computation. However, since the walks are random, they may yield isomorphic maximal patterns. Such isomorphic patterns may be discarded before extracting the representative frequent composite CI patterns. However, while graph isomorphism is in NP, it is not known whether it is NP-complete or is in P.

A sequence of polynomial time filters may be used to create equivalence classes of possibly isomorphism patterns. Thus, the worst-case exponential time algorithm for graph isomorphism method may be applied to only pairs of graphs within the same equivalence class.

Initially M comprises a single equivalence class. Then the following polynomial time filters may, for example, be applied:

NODE MULTISET: Given pattern $P=(V',E',L')$, define $\rho_V(P)=\{L(v_i): v_i \in V\}$ to be a multiset of node labels in P. It is easy to see that two patterns P and P' cannot be isomorphic if $\rho_V(P) \neq \rho_V(P')$. In this case P and P' are put into different equivalence classes, and there is no need to be checked for isomorphism.

EDGE MULTISET: Given pattern $P=(V',E',L')$, for each edge $e_i=(a_i,b_i) \in E'$, define a composite edge label to be the triple $L(e_i)=(L'(a_i),L'(b_i),L'(e_i))$, with $a_i<b_i$. Define the filter $\rho_E(P)=\{L(e_i): e_i \in E'\}$ to be a multiset of composite edge labels for P. Two patterns P and P' cannot be isomorphic if $\rho_E(P) \neq \rho_E(P')$.

LAPLACIAN SPECTRUM: Let A be an adjacency matrix for pattern P, i.e., $A(v_i, v_j)=1$ if $(v_i,v_j) \in E'$, and $A(v_i, v_j)=0$, otherwise. Let D be a diagonal degree matrix for P, defined as $D(v_i,v_j)=\Sigma_{v_j}A(v_i,v_j)$, and $D(v_i, v_j)=0$ for all $v_i \neq v_j$. Define the normalized Laplacian matrix of P as follows:

$N=D^{-1/2} \cdot (D-A) \cdot D^{1/2}$. N is a n×n positive semi-definite matrix, and thus N has n (unnecessarily distinct) real, positive eigen-values: $\lambda_1 \geq \lambda_2 \geq \ldots \geq \lambda_n \geq 0$. Define the Laplacian spectrum of P as the multiset $\rho_S(P)=\{\lambda_i: 1 \leq i \leq n\}$. It is known that two isomorphic patterns are iso-spectral, i.e., they have the same Laplacian spectrum. Thus, P and P' cannot be isomorphic if $\rho_S(P) \neq \rho_S(P')$.

After applying the above polynomial time filters, the set M may be partitioned into smaller equivalence classes of possibly isomorphic maximal frequent composite CI patterns. For each pair of maximal frequent composite CI patterns in the same class, full isomorphism check may be performed using, for example, VF2 algorithm. The output of the full isomorphism check is a final set M of non-isomorphic maximal frequent composite CI patterns in G. Note that at this stage we can find the actual edge disjoint support of all the maximal patterns by using a maximal independent set approach.

Extraction of representative frequent composite CI patterns is detailed hereinafter.

Given a set of non-isomorphic maximal frequent composite CI patterns M, these may first be clustered into groups of similar patterns, and then a representative set of frequent composite CI patterns may be extracted from each cluster. Three main actions may be involved: i) defining pair-wise similarities between maximal frequent composite CI patterns, ii) clustering of similar maximal frequent composite CI patterns, iii) extraction of representative frequent composite CI patterns.

Figure 5:
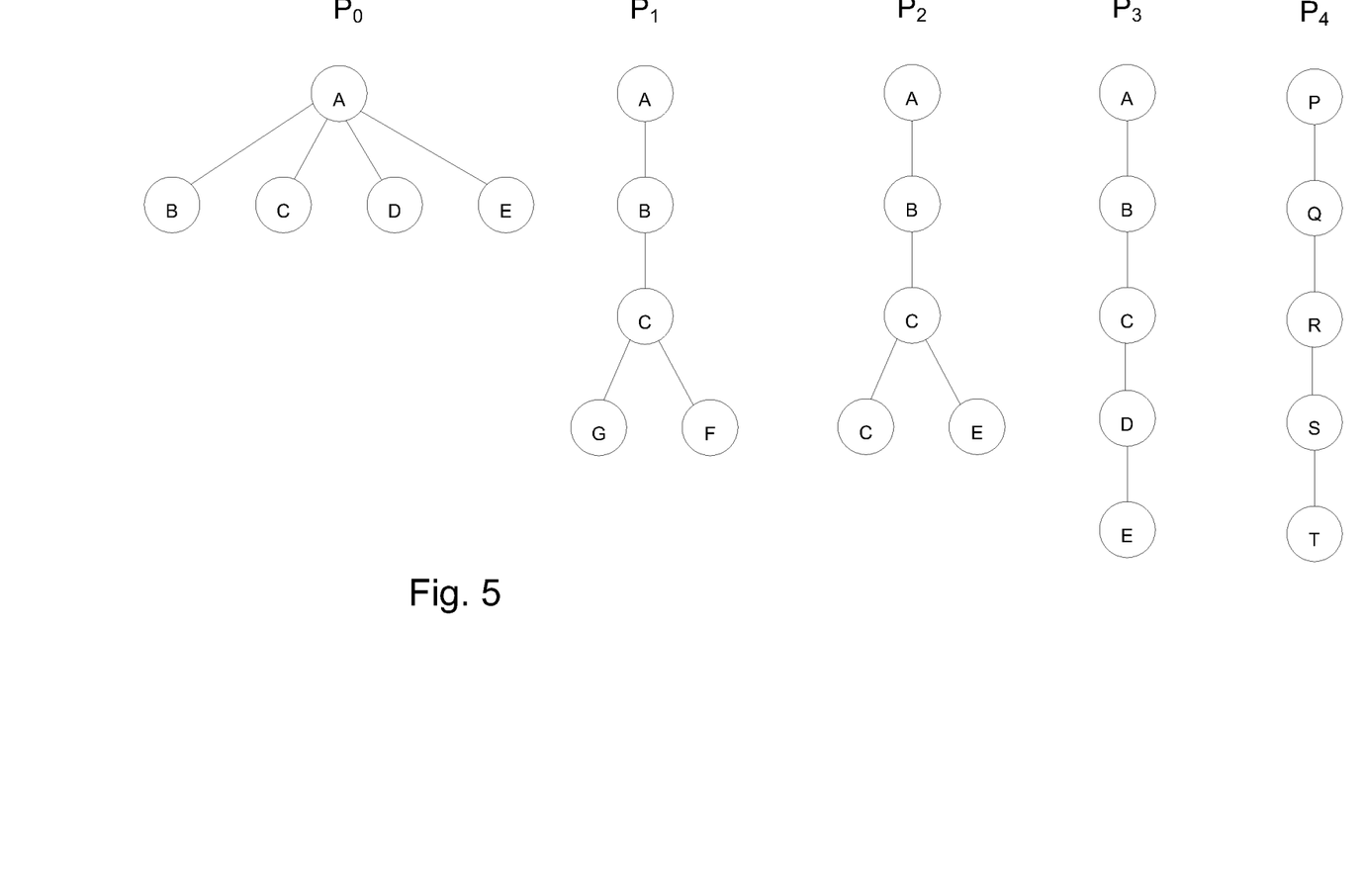
FIG. 5 illustrates five graph patterns with various nodes and labels.

Pattern Similarity:

Before clustering the maximal frequent composite CI patterns, a similarity measure between patterns may be defined, that takes into account both structure and label information. Graph edit distance based methods are commonly used to compute similarity, however, the vast majority of these methods focus mainly on the structure. For example, a purely structure based method would consider $P_1$ and $P_2$ as well as $P_3$ and $P_4$ in FIG. 5 to be highly similar. Some other methods also consider labels. It is proposed to cluster the maximal frequent composite CI patterns based on similarity employing diffusion kernels, which may work well for CMDB graphs. As such the clustering method is independent of the similarity measure, and thus any of the attributed graph similarity measures can also be used.

Similarity between two patterns $P=(V_P,E_P,L_P)$ and $Q=(V_Q,E_Q,L_Q)$, may be defined as $$\text{Sim}(P,Q)=\text{Jaccard}(P,Q)\times\text{Diffusion}(P,Q) \quad (1)$$

Here $$\text{Jaccard}(P, Q) = \frac{|L_P \cap L_Q|}{L_P \cup L_Q}$$

is the Jaccard coefficient between the label sets for P and Q. The more the labels are common, the higher the Jaccard similarity. Diffusion(P,Q) may be a diffusion kernel based similarity between P and Q that considers both the structure and the label information, as described below.

Given P and Q, an augmented weighted graph $R=(V_R, E_R,W_R)$ may be first created. Here $V_R=V_P \cup V_Q \cup \{l|\exists v \in V_P, L_P(v)=l\} \cup \{l|\exists v \in V_Q, L_Q(v)=l\}$, i.e., R contains both structural nodes (those in P and Q) and attribute nodes (labels for nodes in P and Q). $E_R=E_P \cup E_Q \cup \{(v.l):v \in V_P, L_P(v)=l\} \cup \{(v.l):v \in V_Q, L_Q(v)=l\}$. In other words, ER contains both the structural edges (the original edges between vertices in both P and Q), as well as the attribute edges (between a node in P and Q, and its label).

Figure 6:
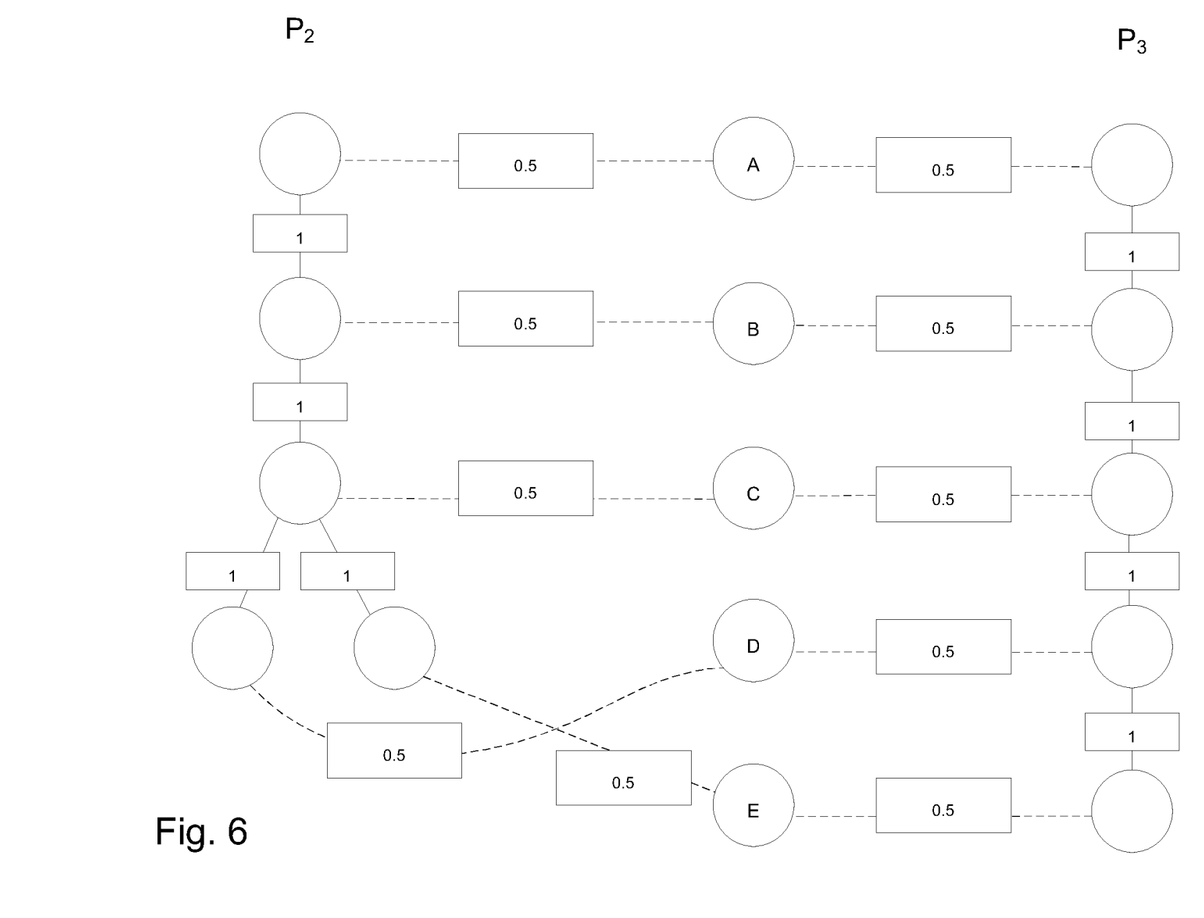
FIG. 6 illustrates the augmented weighted graph for P2 and P3 from FIG. 5.

Finally, $W_R: E_R \to R$ is a function that assigns a weight to each edge. The weights on structural edges are set to 1, i.e., $W(u, v)=1.0$ for all $(u,v) \in E_P \cup E_Q$. The weights on attribute edges are set as follows:

$$W(v.l) = \frac{1}{n_l},$$

where $n_l$ is the number of neighbors of node l in R. In the augmented graph, two structural vertices that have the same label l, are both neighbors of the attribute node l. To avoid inflating the similarity purely due to labels (which has already been accounted for by Jaccard(P,Q)), the fractional weight may be assigned to attribute edges. FIG. 6 illustrates the augmented weighted graph for P2 and P3 from FIG. 5.

To compute Diffusion(P,Q) for each pair of patterns, the diffusion kernel approach may be applied over their augmented graph. A diffusion kernel mimics the physical process of diffusion where heat, gases, etc., originating from a point diffuse with time. On graphs, it is the local similarity that diffuses via continuous time random walks (i.e., with an infinite number of inifitesimally small steps). Given the augmented graph $R=(V_R,E_R,W_R)$, the matrix $W_R$ (see table 6, below) is taken to be the weighted adjacency matrix of R.

TABLE 6

Similarity Matrix

|  | $P_0$ | $P_1$ | $P_2$ | $P_3$ | $P_4$ |
|---|---|---|---|---|---|
| $P_0$ | 0.47 | 0.10 | 0.26 | 0.25 | 0.0 |
| $P_1$ | 0.10 | 0.40 | 0.06 | 0.09 | 0.0 |

TABLE 6-continued

Similarity Matrix

|  | $P_0$ | $P_1$ | $P_2$ | $P_3$ | $P_4$ |
|---|---|---|---|---|---|
| $P_2$ | 0.26 | 0.06 | 0.40 | 0.33 | 0.0 |
| $P_3$ | 0.25 | 0.09 | 0.33 | 0.37 | 0.0 |
| $P_4$ | 0.0 | 0.0 | 0.33 | 0.0 | 0.47 |

Further, define the diagonal degree matrix as $D(v_i,v_i)=\Sigma_{v_j}W_R(v_i,v_j)$, and $D(v_i,v_j)=0$ when $i \neq j$. The Laplacian matrix of R is then defined as: $N=D-W_R$. Finally, the diffusion kernel matrix is defined as $$K = e^{\beta L} = \sum_{k=0}^{\infty} \frac{\beta^k}{k!} L^k,$$

where $\beta$ is a real-valued diffusion parameter, and $e^{\beta L}$ is the matrix exponential (with $L^0=1$ and $0!=1$). Since L is positive semi-definite, it has $|V_R|=n$ real and positive eigenvalues $\lambda_1 \geq \lambda_2 \geq \ldots \geq \lambda_n \geq 0$. Let $u_i$ be the eigenvector corresponding to eigenvalue $\lambda_i$. Then the diffusion kernel can easily be computed as the spectral sum: $K=\Sigma_{i=1}^{n} u_i e^{\beta \lambda_i} u_i^T$. The eigenvalues and eigenvectors of K can be computed in $O(n^3)$ time, where $n=|V_R|$.

The kernel matrix entry $K(v_i,v_j)$ gives the diffusion based similarity between any two vertices in the augmented graph R for patterns P and Q. In particular, those entries $K(u, v)$ where $u \in V_P$ and $v \in V_Q$ may be interesting to consider. We define the diffusion similarity between P and Q as follows:

If $L_P \cap L_Q=0$, then we set Diffusion(P,Q)=0, otherwise $$\text{Diffusion}(P, Q) = \min_{l \in L_P \cap L_Q} \left\{ \max_{\substack{u \in V_P, v \in V_Q \\ (u,l),(v,l) \in E_R}} \{K(u.v)\} \right\}$$

In other words, the diffusion similarity between P and Q is defined as the least label similarity over all labels l, such that the label similarity is the maximum kernel similarity over pairs of nodes u, v that share a given label l. Table 6 shows the pairwise similarities between the patterns shown in FIG. 5, based on Eq. (1), that combines both the Jaccard( ) and Diffusion( ) values.

Clustering:

Graph clustering may be employed to cluster the set of maximal frequent composite CI patterns M. In particular, given the similarity matrix $S(i, j)=\text{Sim}(P_i, P_j)$ between any two patterns$\in$ M, S may be regarded as the weighted adjacency matrix of a similarity graph, where each maximal frequent composite CI pattern is a node, and any two maximal frequent composite CI patterns are linked with weight $S(i, j)$.

Clustering of the maximal frequent composite CI patterns may be considered equivalent to clustering the nodes in the similarity graph. While many algorithms have been proposed for graph clustering, the Markov clustering (MCL) approach may be used since MCL does not require the number of clusters as input.

Let D be the diagonal degree matrix corresponding to the weighted similarity matrix S. Let $N=D^{-1}S$ be the normalized adjacency matrix for the similarity graph. The matrix N is a row-stochastic or Markov matrix that specifies the probability of jumping from node $P_i$ to any other node $P_j$. N is thus a transition matrix for a Markov random walk on the similarity graph. As such, the k-th power of N, namely $N^k$, refers to the probability of transitioning from $P_i$ to $P_j$ in a walk of k steps. MCL takes successive powers of N to expand the influence of a node. However, it damps the extent of a nodes' influence, by an inflation step, aimed at enhancing higher and diminish lower transition probabilities. Given transition matrix N, define the inflation operator γ, given as follows $$\gamma(N, r) = \left\{ \frac{N(i,j)^r}{\sum_{a=1}^{n} N(i,a)^r} \right\}^n_{i,j=1}.$$

In essence, γ takes each element of N to the r-th power, and then re-normalizes the rows to make the matrix row-stochastic.

Given the initial N matrix, and an inflation parameter r, MCL is an iterative matrix algorithm consisting of two main steps: i) expansion: $N=N^2$, followed by ii) inflation: N=γ (N, r). The method converges to a doubly idempotent matrix, and the strongly connected components in the corresponding induced graph yield the final node clusters. The only parameter in MCL is the inflation value r that controls granularity. Higher values lead to more, smaller clusters, whereas smaller values lead to fewer, larger clusters. MCL runs in $O(tn^3)$ time, where |M|=n, and t is the number of iterations until convergence.

Representative Frequent Composite CI Patterns:

Given a set of clusters $C_i$, 1≤i≤k obtained via the MCL approach, the final step is to extract the representative frequent composite CI patterns (also called infrastructure patterns), i.e., representative members from each cluster. Given a similarity threshold θ, from each cluster Ci it is aimed to extract as subset of the patterns $R_i \subseteq C_i$, such that for each $P_j \in C_i$, there exists a pattern $P \in R_i$ with sim($P_j$,P)≥θ. The task is the find a minimal set of representative patterns for each cluster.

However, this problem is equivalent to smallest set cover, an NP-Complete problem, which nevertheless has a greedy Θ(log n) approximation algorithm. The greedy heuristic iteratively chooses the pattern that covers or represents the largest number of remaining elements in a cluster, until all the cluster members are covered.

Figure 7:
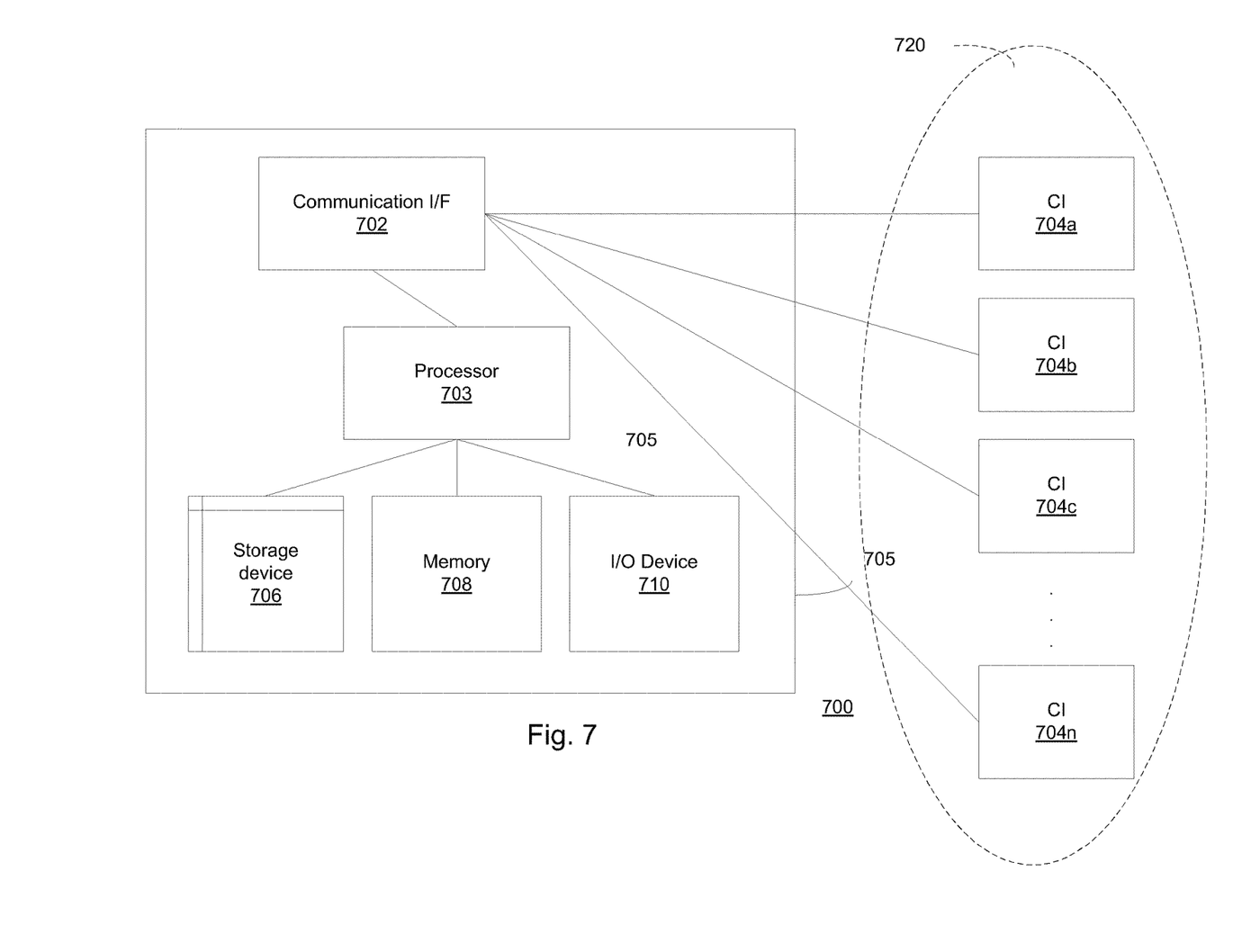
FIG. 7 illustrates a system for discovering representative frequent composite CI patterns in an IT system, in accordance with an example.

FIG. 7 illustrates a system for discovering representative frequent composite CI patterns in an IT system, in accordance with an example.

System 705 may include a communication interface (I/F) 704 for interfacing communications between one or more of CIs 704a, 704b, 704c up to 705n of IT system 720 and processor 703. Processor 403 may be designed to send one or more crawlers to explore IT system 720 and obtain configuration information in the CIs of IT system 720.

Processor 703 may be designed to data mine a graph representing the IT system to extract maximal frequent configuration patterns. Processor 703 may also be designed to cluster the maximal frequent configuration patterns into clusters based on similarity between the maximal frequent configuration patterns, and for each of the clusters, extract a representative composite CI pattern for the IT system. Furthermore, processor 703 may also be designed to output the representative CI pattern pattern for each of the clusters using an output device 710.

Storage device 706, such as, for example, a hard disk, or any other non-transitory computer readable medium may be used to store a program that includes instructions executable by the processor discovering representative composite configuration item patterns for an IT system.

Memory 708 may be provided for storing temporal information in the course of execution of such program.

Input/Output (I/O) device 710 may be provided, such as for example one or more devices selected from the group of device including keyboard, pointing device, touch-sensitive screen, display device, printer, audio signal generator, so as to allow a user to input information and/or commands and to allow outputting information, such as alerts, audio signals, video information etc.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with embodiments of the present invention. In some embodiments of the present invention the instructions stores on the computer readable medium may be in the form of an installed application and in the form of an installation package.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method for discovering representative composite configuration item (CI) patterns in an Information Technology (IT) system that includes a plurality of configuration items (CIs), the method comprising:

for a graph representing the IT system, pruning attributes of a plurality of CI nodes, wherein each CI node of the graph represents a respective one of the CIs of the IT system;

data mining the plurality of CI nodes of the graph representing the IT system to extract composite CI patterns;

determining a plurality of similarity measures for the composite CI patterns, each similarity measure measuring a similarity between a unique pair of composite CI patterns, wherein each similarity measure is calculated by multiplying a Jaccard coefficient times a diffusion kernel similarity value;

clustering a first plurality of the composite CI patterns into a cluster based on the plurality of similarity measures for the composite CI patterns, wherein each composite CI pattern included in the cluster is unique and comprises multiple CI nodes;

extracting a single representative composite CI pattern from the cluster to represent the first plurality of composite CI patterns in the cluster; and using an output device, outputting the single representative composite CI pattern for each of the cluster.

2. The method of claim 1, wherein pruning the attributes of the plurality of CI nodes is based on an entropy distribution of the attributes of the plurality of CI nodes.

3. The method of claim 2, wherein pruning the attributes of the plurality of CI nodes in the graph comprises:
determining the entropy distribution of the attributes of the plurality of CI nodes;
pruning the attributes having an entropy above a highest threshold in the entropy distribution; and
pruning attributes having an entropy below a lowest threshold in the entropy distribution.

4. The method of claim 1, wherein the data mining of the plurality of CI nodes of the graph comprises considering a candidate composite configuration pattern extracted from the graph, and iteratively adding randomly selected graph parts which are found adjacent to that candidate composite CI pattern in the graph, determining whether the candidate composite CI pattern with the added randomly selected graph parts still qualifies as a frequent composite CI pattern, and when the candidate composite CI pattern in the graph does not qualify as a frequent composite CI pattern, disregarding a latter added randomly selected graph part and determining the candidate composite CI pattern with the added randomly selected graph parts but without the latter added randomly selected graph part, to be a composite CI pattern of the graph.

5. The method of claim 1, wherein the data mining of the plurality of CI nodes of the graph representing the IT system to extract composite CI patterns includes computing a flow-based support.

6. The method of claim 1, comprising pruning isomorphic composite CI patterns from the composite CI patterns.

7. The method of claim 1, comprising applying polynomial time filters on the composite CI patterns.

8. The method of claim 1, wherein:
the Jaccard coefficient is based on labels sets of the unique pair of composite CI patterns, and
the diffusion kernel similarity value is based on structure and label sets of the unique pair of composite CI patterns.

9. The method of claim 1, wherein the clustering of the first plurality of composite CI patterns into the cluster comprises considering structural edges and attribute edges in the graph.

10. The method of claim 1, comprising:
generating, based on the graph, an augmented weighted graph that includes both structural nodes and attribute nodes; and
determining the diffusion kernel similarity value based on the augmented weighted graph.

11. A system for discovering representative composite configuration item (CI) patterns for an Information Technology (IT) system that includes a plurality of configuration items (CIs), the system comprising:
a processor to:
for a graph representing the IT system, prune attributes of a plurality of CI nodes, wherein each CI node of the graph represents a respective one of the CIs of the IT system;
data mine the plurality of CI nodes of the graph representing the IT system to extract composite CI patterns;
determine a plurality of similarity measures for the composite CI patterns, each similarity measure measuring a similarity between a unique pair of composite CI patterns, wherein each similarity measure is a product of multiplying a Jaccard coefficient times a diffusion kernel similarity value;
cluster a first plurality of the composite CI patterns into a cluster based on the plurality of similarity measures for the composite CI patterns, wherein each composite CI pattern included in the cluster comprises multiple CI nodes;
extract a single representative composite CI pattern from the cluster to represent the first plurality of composite CI patterns in the cluster;
a communication interface to interface between the processor and the IT system; and
an output device to output the single representative composite CI pattern for the cluster.

12. The system of claim 11, wherein:
the Jaccard coefficient is based on labels sets of the unique pair of composite CI patterns, and
the diffusion kernel similarity value is based on structure and label sets of the unique pair of composite CI patterns.

13. The system of claim 11, wherein the processor is to prune the attributes of the plurality of CI nodes based on an entropy distribution of the attributes of the plurality of CI nodes.

14. The system of claim 13, wherein the processor is to:
determine the entropy distribution of the attributes of the plurality of CI nodes;
prune the attributes having an entropy above a highest threshold in the entropy distribution; and
prune the attributes having an entropy below a lowest threshold in the entropy distribution.

15. A non-transitory computer readable medium having stored thereon instructions for discovering representative composite configuration item (CI) patterns for an Information Technology (IT) system that includes a plurality of configuration items (CIs), which when executed by a processor cause the processor to:
for a graph representing the IT system, prune attributes of a plurality of CI nodes, wherein each CI node of the graph represents a respective one of the CIs of the IT system;
data mine the plurality of CI nodes of the graph representing the IT system to extract composite CI patterns;
determine a plurality of similarity measures for the composite CI patterns, each similarity measure measuring a similarity between a unique pair of composite CI patterns, wherein each similarity measure is calculated by multiplying a Jaccard coefficient times a diffusion kernel similarity value;
cluster a first plurality of the composite CI patterns into a cluster based on the plurality of similarity measures for the composite CI patterns, wherein each composite CI pattern included in the cluster comprises multiple CI nodes;
extract a single representative composite CI pattern from the cluster to represent the first plurality of composite CI patterns in the cluster;
using an output device, output the single representative composite CI pattern for the cluster.

16. The non-transitory computer readable medium of claim 15, wherein:
the Jaccard coefficient is based on labels sets of the unique pair of composite CI patterns, and
the diffusion kernel similarity value is based on structure and label sets of the unique pair of composite CI patterns.

17. The non-transitory computer readable medium of claim 15, wherein the instructions cause the processor to:
  generate, based on the graph, an augmented weighted graph that includes both structural nodes and attribute nodes; and
  determine the diffusion kernel similarity value based on the augmented weighted graph.

\* \* \* \* \*